VOLTAGE-FAULT ABSORBING DEVICE INCLUDING GAS TUBES AND CARBON ARRESTORS

Filed Sept. 14, 1966 2 Sheets-Sheet 1

INVENTOR
A. E. DIETZ
BY Leo Stanger
ATTORNEY

United States Patent Office 3,411,040

Patented Nov. 12, 1968

3,411,040

VOLTAGE-FAULT ABSORBING DEVICE INCLUDING GAS TUBES AND CARBON ARRESTORS

Alfred E. Dietz, Towson, Md., assignor to Bell Telephone Laboratories, Incorporated, Murray Hill, Berkeley Heights, N.J., a corporation of New York Filed Sept. 14, 1966, Ser. No. 579,387
8 Claims. (Cl. 317—62)

This invention relates to voltage protecting devices particularly for absorbing lightning and other voltage faults that may affect telephone apparatuses, such as telephone repeaters, as the faults travel along the individual line pairs in a cable.

In such repeaters, compactness is an essential quality. Present repeaters, especially telephone-pole-mounted repeaters, absorb faults by connecting each incoming line to one of a number of closely-spaced insulated spring leaves biased toward a grounding plate for frictionally retaining respective fault-absorbing carbon arrestors between each leaf and the plate. The arrestors are thus connected across the incoming line. When an incoming voltage exceeds a value, such as 500 volts, determined by the size of a gap between two carbon electrodes in the arrestor, the gap breaks down and grounds potentially dangerous currents before they affect the repeater.

Carbon arrestors are generally suitable for absorbing faults. However, their lives are short. They may require replacement after only a few faults. Such replacement is difficult especially where the repeater equipment is mounted in comparatively inaccessible locations, which is common in repeater equipment that is miniaturized. Also, the breakdown potential of carbon arrestors often varies. Thus, they furnish no predictable degree of protection. Moreover, carbon arrestors as they age exhibit such low extinction voltages that they maintain themselves in a conductive condition in response to normal operating voltages. Thus, the arrestors may act as unintended short circuits after only a few faults.

Other suitable means for arresting faults are gas tubes. When connected across respective lines the tubes can be made to ionize and conduct at comparatively consistent levels, such as 400 volts. They can also be made to exhibit consistently high extinction levels such as 200 volts. However, as they age, gas tubes fail to operate by remaining nonconductive. They then expose the repeaters to fault hazards. Moreover, gas tubes that operate at the desired level of 400 volts breakdown and 200 volts extinction, are quite large and require considerable space. The space required to hold suitable tubes of this type adjacent to each other is much greater than presently available in leaf spring protectors. Substituting their protection for that of carbon arrestors is quite difficult without special equipment, or without enlarging present protector systems. Combining these large tubes with carbon arrestors to obtain the long life primary protection of tubes, and then the short circuit effect of the carbon arrestor after the tubes age, is even more inconsistent with prevailing miniaturization practices. The combinations might require a multiplicity of fault-absorbing device shapes for the protectors to accommodate them. This multiplicity complicates an attending craftsman's operation.

An object of the present invention is to improve such protector systems.

Another object is to improve the fault absorbers themselves.

Another object is to overcome the above deficiencies in protector systems and fault-absorbing devices.

Still another object is to arrest faults with gas tubes and accomplish the above while maintaining present protector system arrangements without enlargement, despite the large size of the tubes.

Still another object is to absorb these faults in adjacent lines of present systems with a plurality of fault absorbers that include gas tubes and carbon arrestors but are identical, so that workmen can install them and replace them without checking their shapes and without the use of special tools.

Yet another object is to incorporate in the identical absorbers, oversized tubes together with the present carbon arrestors, while nevertheless retaining the protector's overall size.

According to the invention these ends are achieved wholly or in part by snapping between each leaf and grounding plate of present protectors, which now hold carbon blocks, one arm of a C-shaped assembly whose central body portion extends transverse to the plate and whose inner and outer edges are lined with C-shaped connector strips, and by connecting in parallel between the strips a carbon arrestor and a neon gas tube, the latter of which resides in a chamber that bulges in the central body but which chamber is offset toward one of the arms in the C-shape. By making the arms identical and alternating the arm which fits into each adjacent leaf terminal, the protector accommodates adjacent gas tubes despite their large size. Preferably, the diameter of the bulge plus the thickness of each C-shaped assembly is less than twice the pitch of the spring leaves. Preferably the width of the arms is identical.

According to another feature of the invention the tube is held in an L-shaped housing that starts in one arm and extends into the central body. Here the connector strips extend into the other arm to retain the arrestor. The chamber extends axially across the central body parallel to the arms and holds the tube with a spring that contacts one connector strip. The other strip is connected to the other end of the tube in the chamber. Preferably a boss on one strip engages the carbon arrestor to hold it.

These and other features of the invention are pointed out in the claims. Other objects and advantages of the invention will become evident from the following detailed description when read in light of the accompanying drawing wherein:

Figure 1:
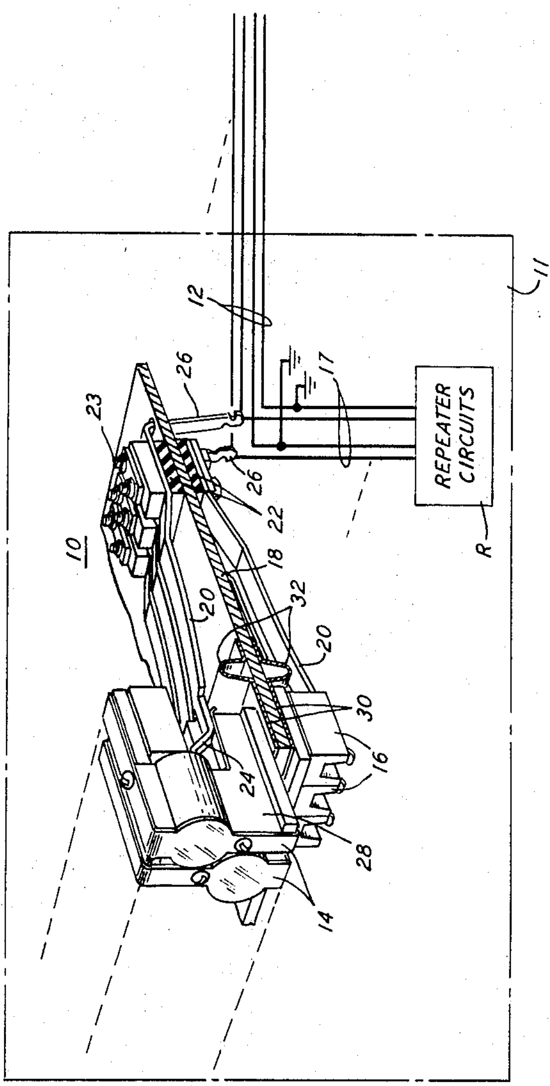
FIG. 1 is a partly schematic and perspective drawing of a protector embodying features of the invention.

In FIG. 1 a protector 10, forming part of a telephone-pole-mounted repeater 11 and connecting to the incoming lines 12 from aerial cables, holds a number of C-shaped protector units 14 embodying features of the invention and several conventional types of carbon-block arrestors 16 which are in the form of assemblies and shown here only for comparison. Leads 17 connect the lines 12 to the repeater circuits R.

In the protector 10 a grounding plate 18 is suitably secured to the cabinet of the repeater 11. A row of spring leaves 20, insulated from contact with the plate 18 by insulating sheets 22, are each held at one end by suitable bolts 23 that bias the contacting ends 24 toward the plate 18. The thus-clamped ends of leaves 20 on the upper side of the plate 18 project through the plate and terminate in depending contact posts 26. The leaves 20 on the lower side turn down into contact posts 26. The posts 26 connect to the lines 12 and to lines 17. The contacting ends 24 are bent up to assure entrance of an arm 28 of protector 10 between the inwardly biased leaves 20 and a contact sheet 30 on the plate 18.

The sheet 30 terminates in a crease 32 that prohibits further entry of the arm 28.

Figure 2:
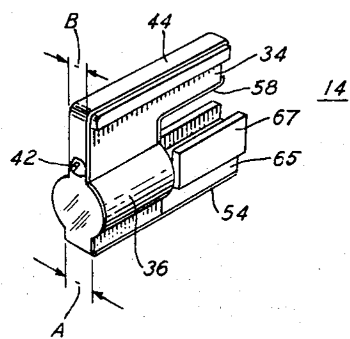
FIG. 2 is a detailed perspective drawing of the fault absorbers of FIG. 1.
Figure 3:
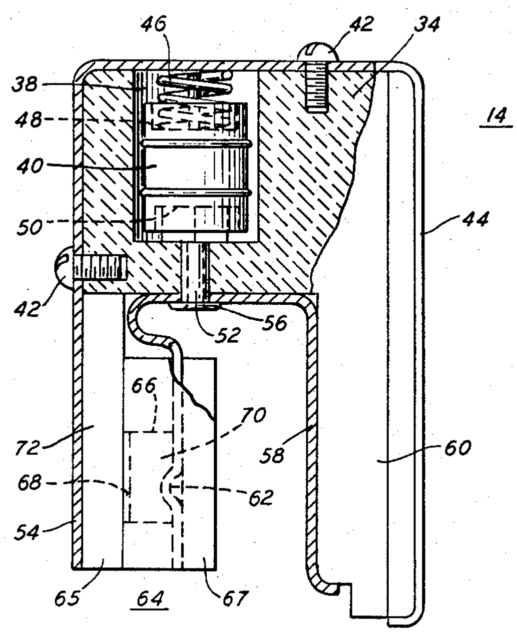
FIG. 3 is a section of FIG 2.

Details of the protector units 14 embodying features of the invention appear in FIGS. 2 and 3. Here an insulating L-shaped housing 34 which is considerably narrower in the dimension than the pitch from leaf 20 to leaf 20 forms a bulged-out portion 36 with a cylindrical chamber 38 that holds a helium, argon gas tube 40. Two screws 42 hold a conductive retainer strip or spring 44. The latter fits against the outer edge of the housing 34 and forces a conductive spring 46 to touch a contact 48 on the tube 40 and to bias the tube so that its other contact 50 presses against a conductive bolt 52.

The strip 44 has a portion 54 that projects beyond the edge of the housing 34. The bolt 52 screws into an eye 56 in a C-shaped inner retainer strip or spring 58 that fits against the arm 60 of the housing 34 and forms a boss 62. Fitting between the portion 54 of strip 44 and strip 58 is a conventional arrestor in the form of an assembly 64. The latter includes a carbon block 65 facing a block 66 in a ceramic holder 67 to form a spark gap 68. The holder 67 is recessed to receive the strip 58. The arrestor assembly 64 is held in place by the pressure exerted by the boss of strip 58.

The strips 44 and 58 serve at once to hold together the housing 34, the tube 40 and the arrestor assembly 64, and to afford the necessary connection between parts. The strip 44 connects one face of the block 65 to one contact 48 of the tube 40 through the spring 46. The strip 58 connects the other to the other contact 50 on the tube 40 through the bolt 52. At the same time the strips 44 and 58 furnish the contact faces necessary for connecting the protector unit 10 between a spring leaf 20 and the sheet 30. The dimensions between the strips 44 and 58 in the arm 60 and what forms the other arm 72 of the C-shaped protector unit 14 are identical.

A protector unit 14 is used by sliding one or the other arm 60 or 72 between the end 24 and the sheet 30 as shown in FIG. 1. Either arm fits because of the identity of dimensions between strips 44 and 58 in arms 60 and 72. A second protector is fitted between the end 24 on the adjacent leaf 20 and the sheet 30 by sliding the other of the arms 60 or 72 between that end and the sheet 30. This staggers the portions 36. Other adjacent protectors can fit between adjacent leaves and sheet 30 by thus staggering the portions 36 despite the portions 36 being larger in diameter than the pitch of the leaves 20. The portions 36 must be offset from the center of the portion between the arms by more than its radius.

The diameter of portion 36 plus the thickness B is less than the pitch of the leaves 20. The diameter of portion 36 is determined by the diameter of tube 40.

In use, currents in the lines 12 pass through the leads 17 connected to contact posts 26 to repeater circuits R. Ordinarily, the tubes 40 and the contact posts are non-conductive. A fault, such as a lightning-induced fault, forms a potential across the tube 40 through a leaf 20, the spring 44, and the spring 46 on one end and the bolt 52, the spring 58, the sheet 30, and the grounding plate 18 on the other end. The fault, upon reaching a given dangerous potential such as 400 volts ionizes the tube 40. The potential across the tube drops to a smaller value and the tube conducts the resulting current to ground. When the fault voltage drops below the 200 volts maintenance potential of the tube, the latter is extinguished and the tube stops conducting.

As long as the tube 40 continues operating, its arrestor remains idle. When the tube ages and stops ionizing properly its arrestor becomes active. The fault then passes from the leads 12 through the leaf 20, the spring 58, the contact 70, across the arrestor 64, through the spring 54, the sheet 18 to the grounding plate 30. These faults after reaching a given level such as 500 volts break down the gap 68.

Generally, the arrestors can accept only a few faults. However, since the tubes, which can accept many more with greater accuracy protect the arrestors from all but the most powerful faults, the life of the entire device is prolonged. When the arrestor stops operating it continues to conduct and thereby protects the apparatus.

By virtue of this structure, it is possible to incorporate the advantages of a gas tube in the protector despite the need to accommodate the protector dimensions to the desirable small pitch between contact leaves 20.

While an embodiment of the invention has been described in detail, it will be obvious to those skilled in the art that the invention may be embodied otherwise without departing from its spirit and scope.

What is claimed is:

1. A fault-absorbing device for connection across one of a plurality of terminal means on a communications protector frame, comprising a gas tube, a carbon spark arrestor, housing means; two C-shaped conductive elements of different size and forming with said gas tube, said carbon arrestor and said housing means a C-shaped assembly with one of said conductive elements extending along the inner edge of said C-shaped assembly and the other of said conductive elements extending along the outer edge of said C-shaped assembly, said C-shaped assembly forming arms transverse to its central body, the distance between said elements in each arm being sufficient to fit into the terminal means so as to make contact therewith, said housing means extending into said central body and having in the central body a holding portion closer to one arm than the other for holding said gas tube, said holding portion being wider than the distance between the C-shaped faces of said assembly and wider than the distance between like parts on adjacent terminals, the sum of the distance between the faces of said assembly and the width of said holding portion being less than twice the distance between like parts on adjacent terminals whereby identical ones of a plurality of respective assemblies may be connected to adjacent terminals by alternating the arm contacting one terminal relative to the arm contacting the adjacent terminal.

2. A device as in claim 1 where in the distance between the elements in each arm is identical to the distance in the other arm.

3. A device as in claim 1 wherein said housing means are L-shaped and extend into the central body and one arm.

4. A device as in claim 3 wherein said other arm comprises portions of said conducting elements extending into said other arm and said arrestor retained between said elements.

5. A device as in claim 4 wherein one of said elements has a projection engaging a dimple in said arrestor for retaining said arrestor.

6. A device as in calim 2 where in said holding portion forms a cylindrical chamber and said gas tube fits in said chamber, said chamber and said tube extending axially in the direction of said arms, said chamber being closed by one of said elements on said C-shaped assembly, and a spring member axially compressed in said chamber.

7. A device as in claim 6 wherein contact means connected to said element on one of said edges extend through said housing to contact said tube.

8. A fault-absorbing system for a telephone assembly comprising a plurality of aligned terminal means, each of said terminal means comprising a portion of common grounding means and a leaf member insulated from said grounding means but biased toward said grounding means, a plurality of gas tubes, a plurality of carbon arrestors a plurality of housing means; a plurality of pairs of conductive elements of different size, each pair forming with one of said gas tubes, one of said carbon arrestors and one of said housing means a C-shaped assembly with one of said conductive elements in each of said assemblies extending along the inner edge of each of said C-shaped assemblies and the other of said conductive elements extending along the outer edge of each of said C-shaped assemblies; each of said C-shaped assemblies forming arms transverse to its central body, the distance between the elements in each of said arms being sufficient to stress outwardly a leaf in each of said terminal means, each of said housing means extending into said central body and having in the central body a holding portion closer to one arm than the other for holding one of said neon tubes, said holding portions being wider than the C-shaped faces of said assemblies and wider than the pitch of said leaves, identical ones of said C-shaped assemblies being held by adjacent ones of said terminals, said assemblies having alternate ones of said arms fitting between adjacent ones of said leaves and said plate, the sum of the distance between faces of one of said assemblies and the width of one of said holding portions being less than twice the distance between like parts on adjacent terminals.

References Cited

UNITED STATES PATENTS

| | | | |
|---|---|---|---|
| 1,876,513 | 9/1932 | Brach | 317—62 |
| 2,424,405 | 7/1947 | Lytgens | 200—115.5 |
| 2,443,134 | 6/1948 | Garibay | 200—130 |
| 3,093,772 | 6/1963 | Miller | 317—62 |

LEE T. HIX, *Primary Examiner.*

R. V. LUPO, *Assistant Examiner.*